US008942520B2

(12) United States Patent
Matsuoka et al.

(10) Patent No.: US 8,942,520 B2
(45) Date of Patent: Jan. 27, 2015

(54) OPTICAL WAVEGUIDE BOARD HAVING GUIDED STRUCTURE AND METHOD OF MANUFACTURING THE SAME, AND METHOD OF MANUFACTURING OPTICAL-ELECTRICAL HYBRID BOARD

(75) Inventors: Yasunobu Matsuoka, Hachioji (JP); Toshiki Sugawara, Kokubunji (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 29 days.

(21) Appl. No.: 13/503,226

(22) PCT Filed: Oct. 19, 2010

(86) PCT No.: PCT/JP2010/068387
§ 371 (c)(1),
(2), (4) Date: Apr. 20, 2012

(87) PCT Pub. No.: WO2011/049087
PCT Pub. Date: Apr. 28, 2011

(65) Prior Publication Data
US 2012/0213470 A1 Aug. 23, 2012

(30) Foreign Application Priority Data
Oct. 21, 2009 (JP) .................. 2009-242455

(51) Int. Cl.
*G02B 6/12* (2006.01)
*G02B 6/43* (2006.01)
*G02B 6/42* (2006.01)
*G02B 6/138* (2006.01)

(52) U.S. Cl.
CPC ............... *G02B 6/43* (2013.01); *G02B 6/4249* (2013.01); *G02B 6/138* (2013.01); *G02B 6/4214* (2013.01); *G02B 6/4224* (2013.01)
USPC .............................. 385/14; 438/24

(58) Field of Classification Search
CPC .......... G02B 6/43; G02B 6/4214; G02B 6/42; G02B 6/12002; G02B 6/132; G02B 6/30; G02B 6/122; G02B 6/1221; G02B 6/125; G02B 6/13; G02B 6/138; G02B 6/29367; G02B 6/2938; G02B 6/4232; G02B 6/4246; G02B 2006/12104; G02B 2006/12097; G02B 2006/121; G02B 2006/12119; H05K 1/0274; H05K 2201/09536; H05K 2201/096; H05K 2201/00918; H05K 2201/2054; H05K 3/4623; H05K 3/4602; H05K 3/4644; H05K 3/4652; H05K 3/4691; H05K 2203/061; H01L 2924/01078; H01L 2924/01079; H01L 2924/01068; H01L 2924/09701; H01L 2924/15312; H01L 2924/16195; H01L 2924/3011; H01L 2924/3025; H01L 2224/16; H01L 2224/16237; H01L 2224/73253; H01L 2224/8121; H01L 2224/81801; H01L 2224/81815; H01L 23/48; H01L 24/81; H01L 25/167; H01L 27/1443; H01L 31/0203; H01L 31/0232; G06F 1/105; H01S 5/02248; H01S 5/02284; H01S 5/02292
USPC ................. 385/14, 129, 88, 127, 147, 24, 47; 257/E23.01, E27.128, E31.118, 257/E31.128, 432, 433, 778; 264/1.24; 326/91, 101; 327/113, 237, 292; 492/162; 438/24
See application file for complete search history.

(56) References Cited

U.S. PATENT DOCUMENTS

| 5,284,725 | A  | * | 2/1994  | Takatsu ............................ 430/5 |
| 5,394,490 | A  | * | 2/1995  | Kato et al. ...................... 385/14 |
| 6,438,281 | B1 | * | 8/2002  | Tsukamoto et al. ............ 385/14 |
| 6,813,756 | B2 | * | 11/2004 | Igarashi et al. ............... 327/156 |
| 7,138,326 | B2 | * | 11/2006 | Cox et al. ...................... 438/612 |
| 2004/0234224 | A1 | * | 11/2004 | Ishizaki et al. ............... 385/129 |
| 2006/0078248 | A1 | * | 4/2006  | Sasaki et al. .................. 385/14 |
| 2006/0088246 | A1 | * | 4/2006  | Han et al. ....................... 385/47 |
| 2008/0279518 | A1 | * | 11/2008 | Yonekura et al. ............. 385/127 |
| 2008/0285910 | A1 | * | 11/2008 | Yamada et al. ................. 385/14 |

| | | | | | |
|---|---|---|---|---|---|
| 2010/0135611 | A1* | 6/2010 | Asai et al. | | 385/14 |
| 2010/0166363 | A1 | 7/2010 | Matsuoka et al. | | |
| 2011/0052118 | A1* | 3/2011 | Matsuoka | | 385/14 |

FOREIGN PATENT DOCUMENTS

| | | | | | |
|---|---|---|---|---|---|
| JP | 06281826 | A | * 10/1994 | | G02B 6/12 |
| JP | 2000-352636 | A | 12/2000 | | |
| JP | 2001-110188 | A | 4/2001 | | |
| JP | 2003-050329 | A | 2/2003 | | |
| JP | 2003-114365 | A | 4/2003 | | |
| JP | 2004-053659 | A | 2/2004 | | |
| JP | 2004-069824 | A | 3/2004 | | |
| JP | 2005-275343 | A | 6/2005 | | |
| JP | 2005275343 | A | * 10/2005 | | G02B 6/13 |
| JP | 2006-235126 | A | 9/2006 | | |
| TW | 200848814 | A | 12/2008 | | |
| WO | WO 2008/035466 | A1 | 3/2008 | | |

* cited by examiner

OTHER PUBLICATIONS

Office Action dated Nov. 20, 2012, in Japanese Patent Application No. 2011-537263.

*Primary Examiner* — Peter Radkowski

(74) *Attorney, Agent, or Firm* — Miles & Stockbridge P.C.

(57) ABSTRACT

In the optical waveguide board, simultaneously with pattern formation of mirror members at arbitrary positions on a clad layer 11, guiding patterns 14 having convex shapes are formed respectively at arbitrary positions on peripheral parts of mirror patterns 13, and the mirror patterns 13 are worked into tapered shapes. Next, in a state that a mask member 100 having through holes at desired positions, and the guiding patterns 14 are guided by mating, a metal film is formed on surfaces of slope parts 22 of the mirror patterns and the guiding patterns 14. Furthermore, in a state that the guiding patterns 14 and the photomask 16 are guided, wiring core patterns 20 are formed on the clad layer 11 adjacent to the mirror patterns 13.

8 Claims, 9 Drawing Sheets

OPTICAL WAVEGUIDE BOARD HAVING GUIDED STRUCTURE AND METHOD OF MANUFACTURING THE SAME, AND METHOD OF MANUFACTURING OPTICAL-ELECTRICAL HYBRID BOARD

TECHNICAL FIELD

The present invention relates to an optical waveguide and an optical connection part provided with a guided structure in an optical waveguide board that transmits high-speed optical signals transmitted and received between chips and between boards in equipment such as a rack, and an optical-electrical hybrid board that performs bulk processing of the transmitted and received optical signals on the board, and a method of manufacturing a board using the same.

BACKGROUND ART

In recent years, in the information and telecommunications field, maintenance of communication traffic using optical signals has been progressed rapidly, and so far backbone-, metro-, and access-system fiber-optic networks for relatively long distance communication of several kilometers or more have been deployed. From now on, furthermore, it is effective to use optical signals for processing a large amount of data without delays in short distance rack-to-rack (several meters to several hundred meters) and intra-rack (several centimeters to several ten centimeters) communications, and use of light in inter-LSI transmission and LSI-to-backplane transmission inside information equipment such as a router and a server is being advanced. In optical wiring between equipment/inside equipment, for example in a rack such as a router/switch, high-frequency signals transmitted from the outside by the Ethernet and the like through an optical fiber are input to a line card. Several line cards are used for one backplane, signals input to each line card are further gathered at a switch card through the backplane, and after processing the signals in an LSI in the switch card, the signals are output again to each line card through the backplane. Here, in an existing device, currently signals of several hundred Gbps or more from each line card are gathered at the switch card through the backplane. To transmit the signals with existing electrical wirings, it is necessary to divide the signals to approximately several Gbps per wiring because of propagation loss, and thus 100 or more wirings are necessary.

Furthermore, a pre-emphasis/equalizer for the high-frequency lines, and countermeasures for reflection or crosstalk between wirings are necessary. When systems handle further larger capacities from now on, and a device processes information of Tbps or more, problems such as the number of wirings and countermeasures for crosstalk become more serious with conventional electrical wirings. In contrast, use of light in signal transmission lines between intra-rack boards of a line card, a backplane, and a switch card, and furthermore intra-board chips is promising because it allows propagation of high-frequency signals of 10 Gbps or more with low loss so that the number of wirings is allowed to be less, and the above-described countermeasures become unnecessary even for high-frequency signals.

To realize such a high-speed optical interconnection circuit and apply in equipment, an optical wiring board using, for signal wiring, an optical waveguide that excels in performance and parts mountability with an inexpensive fabrication means is necessary. As an example of an optical wiring board using an optical waveguide, an example of an optical waveguide board in which an optical waveguide layer and a beam turning mirror member are formed integrally is disclosed in Patent Literature 1. In this example, an optical-electrical wiring board has a board having an electrical wiring, an optical wiring layer having a core and a clad positioned on at least one surface of the board, and a mirror member embedded between the board and the optical wiring layer. Also, the board is fabricated by using a manufacturing method including a step of arranging the mirror member on the board, and a step of forming the optical wiring layer to cover the mirror member on the board. In this way, by arranging the mirror member on the optical wiring board, and forming the optical wiring layer to cover the mirror member, the mirror member can be arranged at an arbitrary position on the board, and flexibility of mounting layout improves. Also, by fabricating the mirror member separately, and placing the mirror member on the board, aggravation of a board fabrication yield ratio accompanying the mirror fabrication step can be avoided.

Also, as another example of conventional techniques of a method of manufacturing an optical waveguide board, Patent Literature 2 discloses an example of a method of manufacturing a mirror for deflection to an optical waveguide. In this example, in the method of manufacturing a mirror for deflection to an optical waveguide, in forming the deflection mirror in the optical waveguide by making a cut in the optical waveguide to form a groove having a slope surface with a dicing blade at least one surface of which has a desired slope angle, one having a planar part with width same as or larger than the depth of the groove at a tip surface of a cutting edge is used as the dicing blade. With the method of this example, a tapered surface of the deflection mirror and an end surface of a wiring core can be formed with a single process of dicing; therefore, fabrication of an optical waveguide board retaining a deflection mirror is possible with fewer fabrication steps.

CITATION LIST

Patent Literatures

Patent Literature 1: Japanese Patent Application Laid-Open Publication No. 2003-50329
Patent Literature 2: Japanese Patent Application Laid-Open Publication No. 2006-235126

SUMMARY OF INVENTION

Technical Problem

In the manufacturing method and the structure of mounting a separately fabricated mirror member on a board, and embedding the mirror member with an optical waveguide disclosed in Patent Literature 1, it is difficult to respectively mount the separately fabricated mirror at a high guiding accuracy of μm order, and the numbers of parts and steps, and furthermore takt time increase.

Also, the mirror member needs to be metal to reflect light highly efficiently, but there is a risk that in this case, an yield ratio and reliability may be aggravated by peeling of cores due to a difference in linear coefficients of expansion of the mirror member and the organic optical waveguide that embeds the mirror member, and poor adhesion at metal interfaces.

Also, in the method of manufacturing a mirror for deflection to an optical waveguide disclosed in Patent Literature 2, because a slope surface of a mirror has a forward-tapered shape with respect to a surface parallel to a board, a reflective film such as metal needs to be formed on the slope surface of the mirror to deflect light input to and output from the optical waveguide. In forming the reflective film, the slope surface of the mirror and an end surface of the optical waveguide need to be sufficiently separated considering alignment accuracy of a mask and the like so that the reflective film does not adhere to the end surface of the optical waveguide. Thereby, a concern arises that optical loss due to beam divergence of light incident on and emitted from the end surface of the optical waveguide may increase. On the contrary, to make the distance between the slope surface of the mirror and the end surface of the optical waveguide smaller, it is possible to protect parts other than the slope surface of the mirror with a resist film and the like in advance so that the reflective film does not adhere to the end surface of the optical waveguide in forming the reflective film. However, in this method, a photo-lithography step of performing resist formation and patterning and a step of removing the reflective film deposited on the resist film and the resist film become necessary to increase process steps, and there is a risk that an yield ratio and reliability may be aggravated due to remaining of resist film and peeling of cores at the time of film removal.

Accordingly, an object of the present invention is to provide a guided structure provided in an optical waveguide and an optical connection part in an optical waveguide board that transmits high-speed optical signals transmitted and received between chips and between boards in equipment such as a rack, and an optical-electrical hybrid board that performs bulk processing of the transmitted and received optical signals on the board, that can reduce parts, simplify steps, and be fabricated with high guiding accuracy and a high yield ratio, and a method of manufacturing a board using the same.

Solution to Problem

In the present invention, to solve the above problem, in an optical waveguide board configured by an optical waveguide layer that is surrounded by a clad layer laminated on a board, and formed by a wiring core having a reflective index higher than that of the clad layer, and made of a photosensitive polymer material, and a mirror part for inflecting light input to and output from an optical device into a direction vertical to the board and optically connecting the light with the wiring core, simultaneously with pattern formation of a mirror member at an arbitrary position on the clad layer, two or more guiding patterns having convex shapes are formed respectively at arbitrary positions on peripheral parts of a mirror pattern, and the mirror pattern is worked into a tapered shape.

Afterward, a metal film is formed on a slope part of the mirror pattern and the guiding patterns in a state that a mask member having a through hole at a desired position and the guiding patterns are guided by mating.

Furthermore, an optical waveguide board is manufactured by a method of forming a wiring core pattern on the clad layer adjacent to the mirror pattern in a state that the guiding patterns and a photomask are guided.

Also, an optical waveguide board is manufactured by a method of, simultaneously with formation of a second guiding pattern that is positioned on the guiding patterns and has a convex shape on the clad layer surrounding the guiding patterns, respectively forming a second mirror pattern on the clad layer positioned on the mirror pattern, and multilayer-laminating a second wiring core pattern on the clad layer adjacent to the second mirror pattern in a state that the second guiding pattern and a mask member are guided.

Furthermore, an optical-electrical hybrid board is manufactured by a method of, simultaneously with formation of the second guiding pattern that is positioned on the guiding patterns and has a convex shape on the clad layer surrounding the guiding patterns, respectively forming a third guiding pattern on the clad layer positioned on the mirror pattern, and placing, on the third guiding pattern, a laser diode and a photo diode having concave shapes for mating with the pattern or an optical module board on which the laser diode and the photo diode are respectively mounted.

Advantageous Effects of Invention

By using a manufacturing method according to the present invention, a metal film can be formed on a tapered part of a mirror pattern and guiding patterns in a state that a mask member having a through hole at a desired position and the guiding patterns provided simultaneously with formation of the mirror pattern are guided by mating. Thereby, because a conventional photo-lithography step using a resist film and the like is unnecessary, a mirror part of an optical waveguide can be fabricated with a simple technique with a high yield ratio. Also, by separating a step of fabricating the mirror part and an optical reflective film, and a step of forming a wiring core, there is not a risk that an optical reflective film may adhere to an end surface of an optical waveguide when forming the reflective film; therefore, it becomes possible to form a slope surface of a mirror and an end surface of an optical waveguide in proximity, and a possibility of concern about an increase of optical loss due to beam divergence of light incident on and emitted from an end surface of an optical waveguide can be avoided. Also, by forming the wiring core by lithography with reference to the guiding patterns provided simultaneously with formation of the mirror pattern, it becomes easy to form a mirror pattern and the wiring core relatively with high guiding accuracy of μm order. Furthermore, by forming a clad layer, the mirror pattern, and the wiring core by repeating lamination and working to build them up sequentially on a board using the manufacturing method, an optical wiring can be fabricated with processes on a consistent board; therefore, significant reduction in the numbers of parts and steps can be achieved, and it is advantageous in multilayer formation.

Furthermore, by a manufacturing method of, simultaneously with formation of a second guiding pattern on the clad layer on the guiding patterns, respectively forming a third guiding pattern on the clad layer on the mirror pattern, and then placing optical devices having concave shapes or an optical module board on which the optical devices are respectively mounted, an optical-electrical hybrid board in which the optical devices, the mirror pattern, and the wiring core can be optically connected simply with high guiding accuracy of μm order due to the third guiding pattern is completed.

As a result, the present invention provides an effect that it is possible to provide a guided structure provided in an optical waveguide and an optical connection part in an optical waveguide board that transmits high-speed optical signals transmitted and received between chips and between boards in equipment such as a rack, and an optical-electrical hybrid board that performs bulk processing of the transmitted and received optical signals on the board, that can reduce parts, simplify steps, and be fabricated with high guiding accuracy and a high yield ratio, and a method of manufacturing a board using the same.

DESCRIPTION OF EMBODIMENTS

Hereinafter, embodiments of the present invention are described in detail with reference to drawings.

First Embodiment

FIGS. 1A to 1G are figures for explaining a method of manufacturing an optical waveguide board that is a first embodiment of the present invention.

Figure 1A:
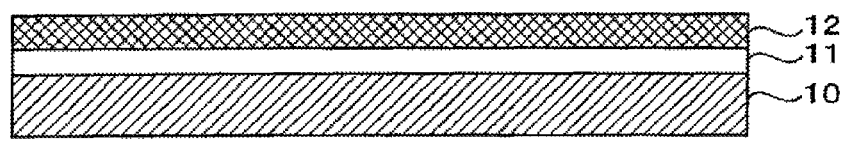
FIG. 1A is a figure for explaining a method of manufacturing an optical wiring board that is a first embodiment of the present invention.

FIG. 1A is a figure showing a state that a clad layer 11 with thickness of approximately 30 μm is formed on a board 10, and thereon a core member 12 with a refractive index higher than that of the clad layer 11 and thickness of approximately 50 μm is formed by spin coating or lamination.

In the present embodiment, glass epoxy generally used in a printed board is used as a board material, and as materials of the clad layer 11 and the core member 12, photosensitive polymers that have absorption peaks in the ultraviolet light wavelength band, are cured by being irradiated with ultraviolet light, and can be patterned by photo-lithography are used from the aspect of simplification of a fabrication step and affinity with a printed board.

Figure 1B:
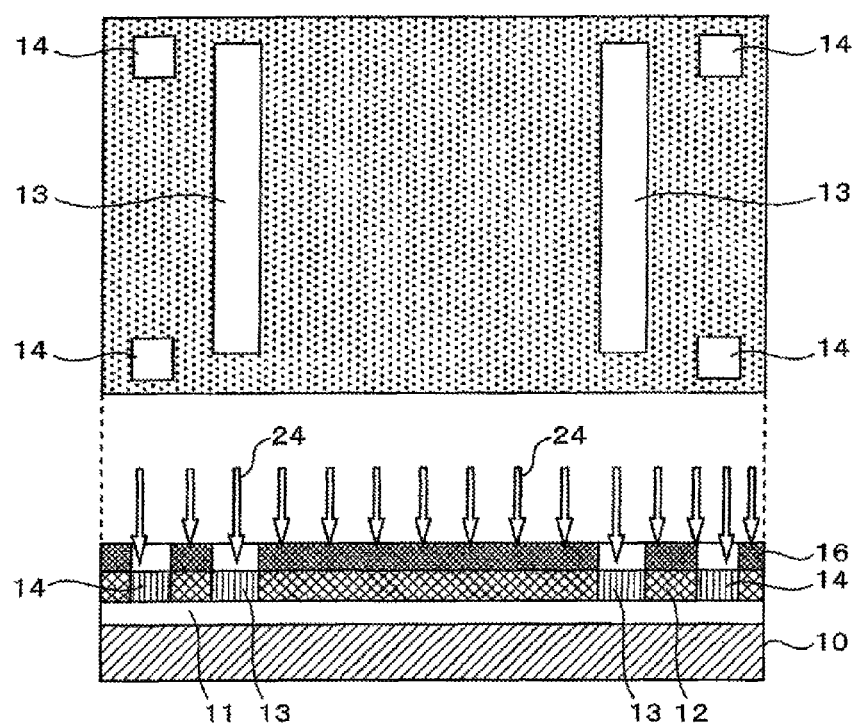
FIG. 1B is a figure for explaining the method of manufacturing the optical wiring board that is the first embodiment of the present invention.

Next, as shown in FIG. 1B, by photo-lithography of irradiating ultraviolet light 24 onto the core member 12 on a top surface of the clad layer 11 through pattern opening parts using a photomask 16 in which a pattern is provided, mirror members 13 of rectangular parallelepiped shapes are exposed with light and developed to be formed. At this time, simultaneously with formation of the core pattern, guiding patterns 14 are formed by the photo-lithography at arbitrary positions (four corners in this example) on peripheral parts of the mirror members 13. In FIG. 1B, a cross section at the time of exposure with light is shown for convenience of illustration. The core member 12 irradiated with the ultraviolet light and the core member 12 not irradiated with the ultraviolet light are distinguished by types of hatching. By development after exposure with light, the core member 12 excluding an area of the core member 12 irradiated with the ultraviolet light is removed. That is, in this figure, the core member 12 other than the mirror members 13 and the guiding patterns 14 is removed. Although photo-lithography with the photomask 16 is used in core pattern formation here, pattern formation is possible similarly by direct lithography not using a photomask as another fabrication technique.

Figure 1C:
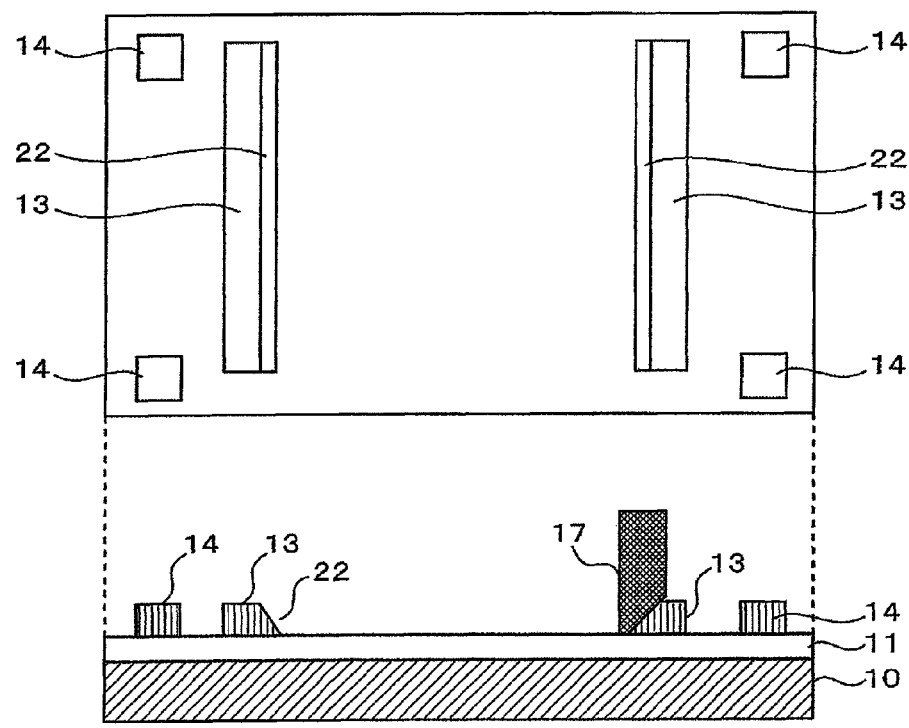
FIG. 1C is a figure for explaining the method of manufacturing the optical wiring board that is the first embodiment of the present invention.

Next, as shown in FIG. 1C, mirror patterns 13 having slope parts 22 are formed on each side surface of the rectangular parallelepiped shaped mirror members 13 by dicing using a metal blade 17. Other than cutting by dicing in this example, physical working by high-power laser irradiation may be used as a technique of forming the slope parts 22.

Figure 1D:
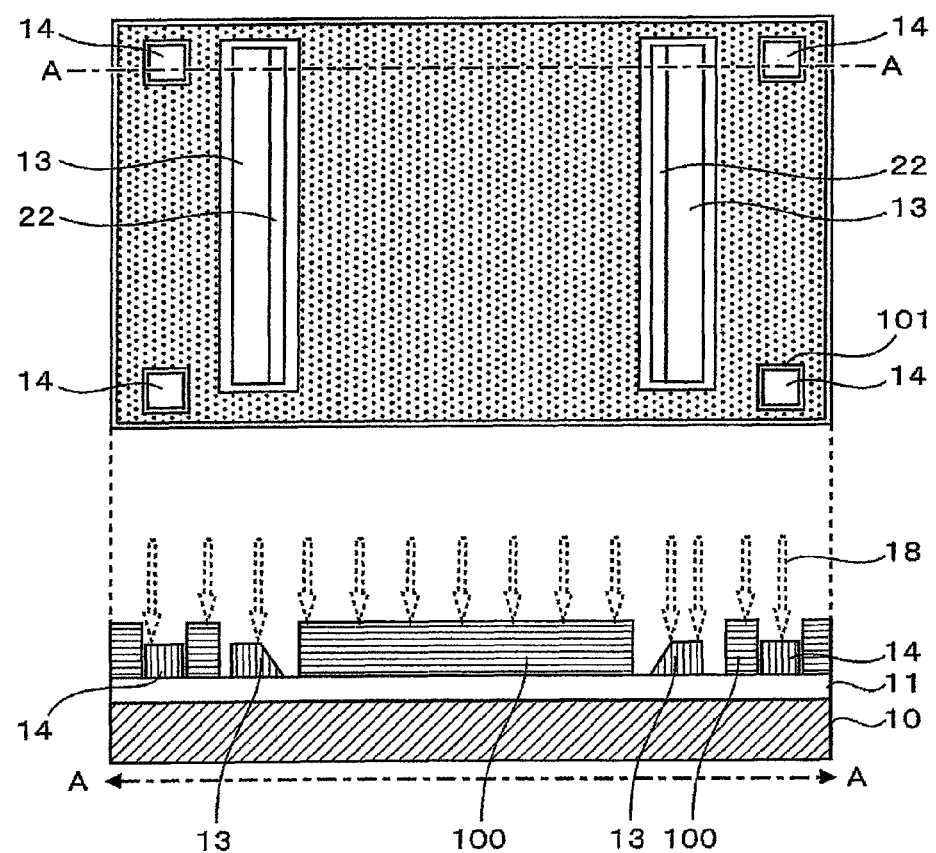
FIG. 1D is a figure for explaining the method of manufacturing the optical wiring board that is the first embodiment of the present invention.

Next, as shown in FIG. 1D, through holes provided at desired positions on the mask member 100, and the guiding patterns 14 are guided by mating, and a metal film 18 for optical reflection is coated on surfaces of the slope parts 22 of the mirror patterns 13 and the guiding patterns 14. The metal film is formed with materials such as Cr and Au at the top surface with high reflectance to used wavelength light, and is formed to cover from the top surfaces of the slope parts 22 of the mirror patterns 13 to the surface of the clad layer 11. It is useful to use a thin-film metal machined board with thickness of 0.05 to 0.3 mm as the mask member 100 so that mating with the through holes is easy using steps of the guiding patterns 14 with thickness of approximately 50 μm. The upper limit of the film thickness of the thin-film metal machined board is decided from the aspects of easiness of mating with the through holes as mentioned above and working accuracy of the through holes; on the other hand, the lower limit is decided from the aspect of strength of the mask member. Also, gaps 37a between the guiding patterns 14 and the through holes of the mask member 100 are desirably approximately 10 to 20 μm or less considering accuracy required for optical members and fabrication tolerance, but gaps between the mirror patterns 13 and the through holes may be larger than them.

Figure 1E:
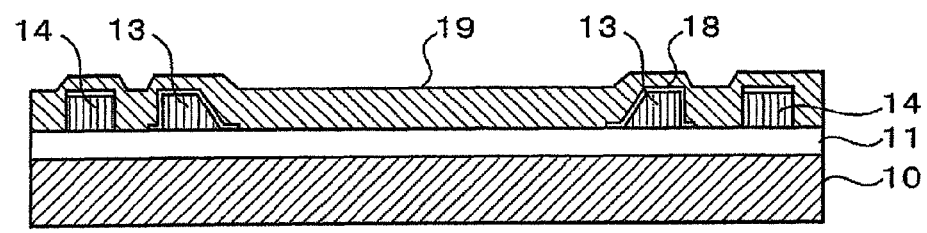
FIG. 1E is a figure for explaining the method of manufacturing the optical wiring board that is the first embodiment of the present invention.

Next, as shown in FIG. 1E, a core member 19 of the same material system as the mirror is formed on the mirror patterns 13 by spin coating or lamination.

Figure 1F:
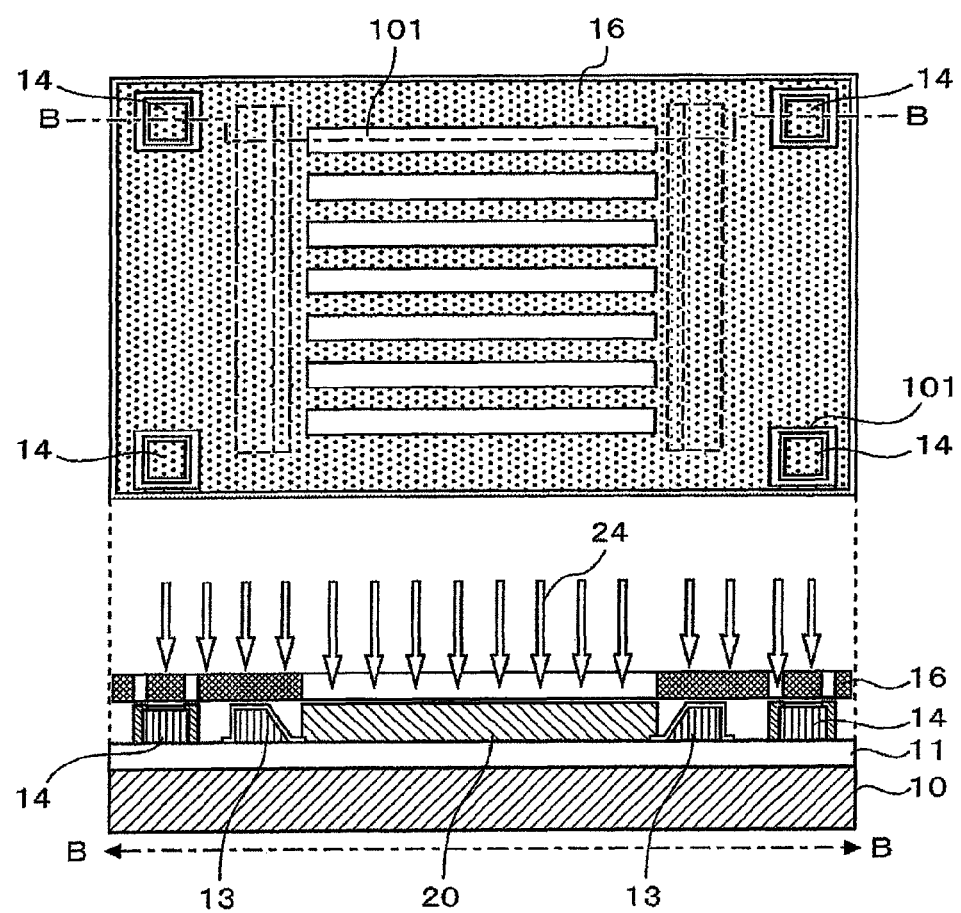
FIG. 1F is a figure for explaining the method of manufacturing the optical wiring board that is the first embodiment of the present invention.

Thereafter, as shown in FIG. 1F, similar to the procedure explained in FIG. 1B, by photo-lithography of irradiating the ultraviolet light 24 onto the core member 19 using the photomask 16 in which opening patterns 101 are provided, wiring core patterns 20 are exposed with light and developed to be formed in bulk on the board. For convenience of illustration, FIG. 1F simultaneously shows both a state at the time of exposure with light and a state that patterns have been formed by the development after the exposure with light. That is, the ultraviolet 24 and the photomask 16 at the time of exposure with light are illustrated, and simultaneously the wiring core patterns 20 patterned by development after the exposure with light are illustrated. The photomask 16 is guided while being observed in a state that the patterns of the guiding patterns 14 and the patterns of the photomask 16 are overlapped. As in the manufacturing method of the present invention, the above structure can be fabricated easily and with high guiding accuracy by forming wiring core patterns by photo-lithography after fabricating the mirror patterns 13.

Figure 1G:
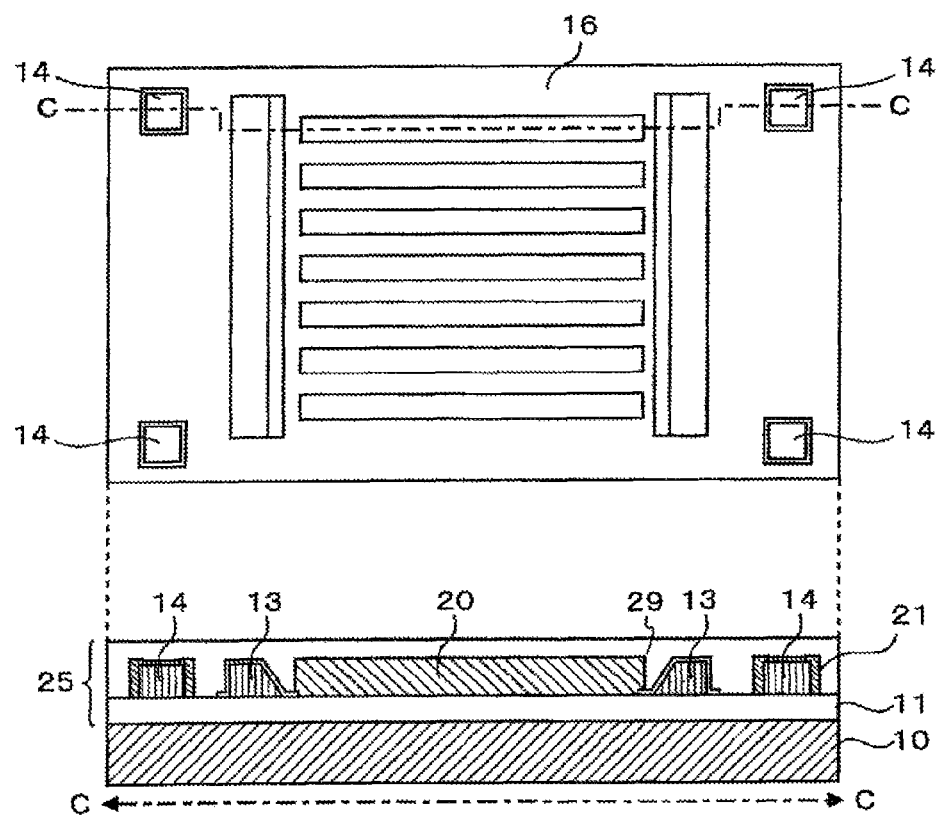
FIG. 1G is a figure for explaining the method of manufacturing the optical wiring board that is the first embodiment of the present invention.

Lastly, as shown in FIG. 1G, a clad material 21 is formed on the mirror patterns 13 and the wiring core patterns 20 by spin coating or lamination. This clad layer 21 is approximately 80-μm thick, makes up space between the mirror patterns 13 and the wiring core patterns 20, and forms an optical waveguide layer 25 surrounding the wiring core patterns 20.

Second Embodiment

Figure 2:
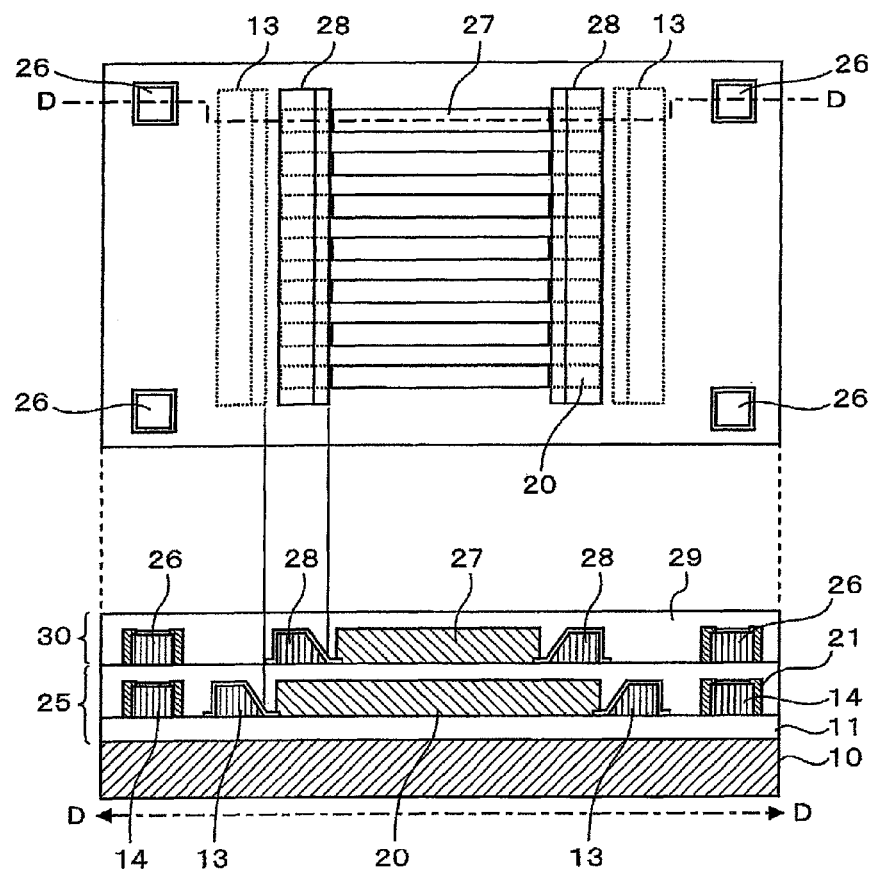
FIG. 2 is a view of the top surface and a cross section of an optical waveguide board that is a second embodiment of the present invention.

FIG. 2 is a view of the top surface and a cross section of an optical waveguide board that is a second embodiment of the present invention. Here, an example that two optical waveguide layers are laminated in the optical waveguide board of the present invention is shown.

First, the first optical waveguide layer 25 in which the mirror patterns 13, the guiding patterns 14, and the wiring core patterns 20 are respectively surrounded by the clad layer 21 is formed on the board 10 by the procedure of FIGS. 1A to 1G explained in the first embodiment. Next, guiding patterns 26 are formed on the clad layer 21 by photo-lithography simultaneously with pattern formation of the mirror members by a procedure similar to FIGS. 1A to 1B. At this time, it is possible to guide the first optical waveguide layer 25 and the patterns formed thereon relatively accurately by aligning with patterns of a photomask while observing the guiding patterns 14 in the first optical waveguide layer 25.

Next, after forming mirror patterns 28 having slope parts by dicing, the through holes provided on the mask member and the guiding patterns 26 are guided by mating, and a metal film for optical reflection is coated on surfaces of the mirror patterns 28 and the guiding patterns 26 by a procedure similar to FIGS. 1C to 1D.

Lastly, after forming wiring core patterns 27 by photo-lithography, a second optical waveguide layer 30 is laminate-formed by surrounding the mirror patterns 28 and the wiring core patterns 27 with a clad layer 29 by a procedure similar to FIGS. 1E to 1G.

Although a manufacturing method of laminating two optical waveguide layers is described here, it is possible to laminate three or more multiple layers by repeating a procedure similar to that explained in FIGS. 1A to 1G.

Third Embodiment

Figure 3:
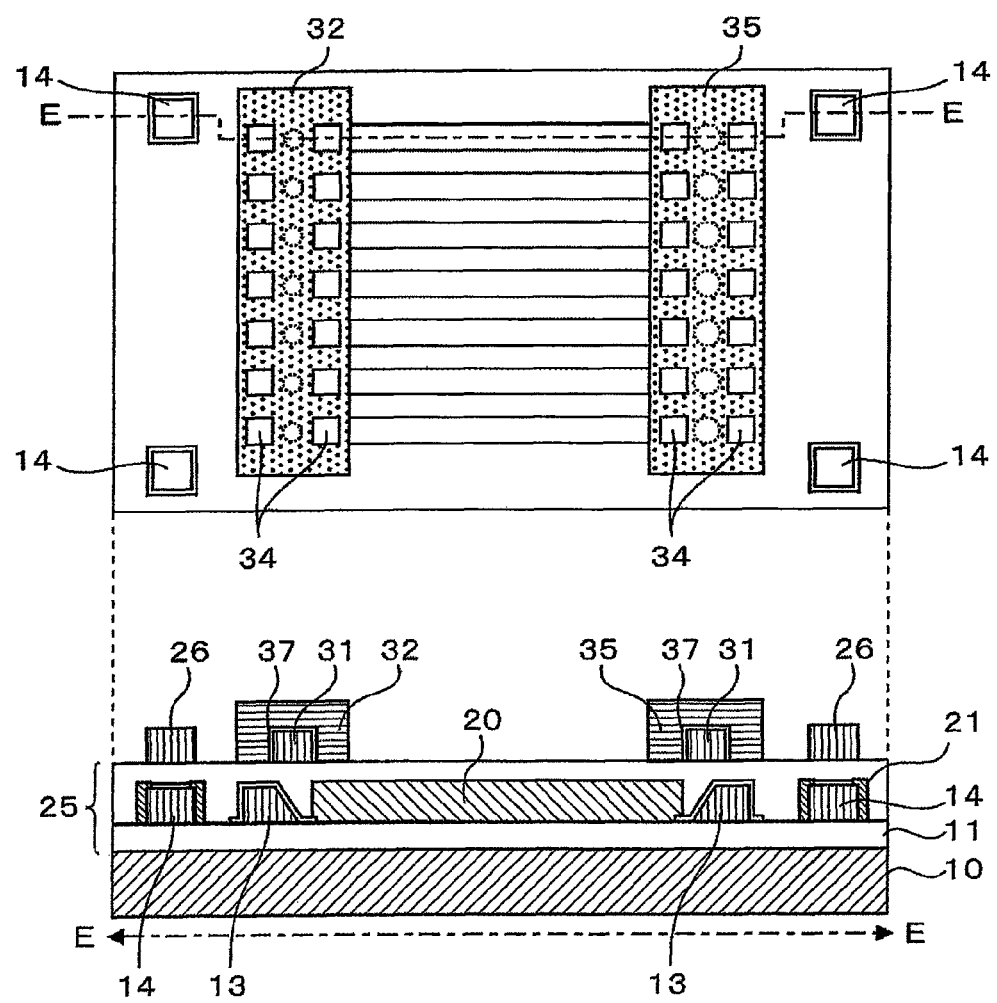
FIG. 3 is a view of the top surface and a cross section of an optical waveguide board that is a third embodiment of the present invention.

FIG. 3 is a view of the top surface and a cross section of an optical waveguide board that is a third embodiment of the present invention. Here, an example that a laser diode and a photo diode are respectively mounted on the optical waveguide board of the present invention is shown.

As a fabrication means of this structure, first, the first optical waveguide layer 25 in which the mirror patterns 13, the guiding patterns 14, and the wiring core patterns 20 are respectively surrounded by the clad layer 21 is formed on the board 10 by the procedure of FIGS. 1A to 1G explained in the first embodiment. Next, convex shaped third guiding patterns 31 are formed on the clad layer 21 positioned on the slope parts of the mirror patterns 13 simultaneously with formation of the guiding patterns 26 by photo-lithography while observing the guiding patterns 14 in the first optical waveguide layer 25 by a procedure similar to FIGS. 1A to 1B.

Thereafter, by mating and mounting the third guiding patterns 31, and a laser diode array 32 and a photo diode array 35 having concave shapes, an optical-electrical hybrid board in which the laser diode array and the photo diode array are guided accurately at desired positions on the optical waveguide board is completed simply.

Gaps 37b between the third guiding patterns 31, and concave parts of the laser diode array 32 and the photo diode array 35 are desirably approximately 10 to 20 μm or less considering accuracy required for optical members and fabrication tolerance. Also, although a material of the third guiding patterns 31 is not specified in particular, a material of the same material system as those of the mirror patterns 13 and the wiring core patterns 20, that is, a polymer material that has an absorption peak in the ultraviolet light wavelength band is desirable in terms of workability and permeability to used wavelength light. Furthermore, the used laser diode array 32 and photo diode array 35 are suitably a surface emitting laser diode and a surface receiving photo diode that are suitable for mounting on a board surface.

Fourth Embodiment

Figure 4:
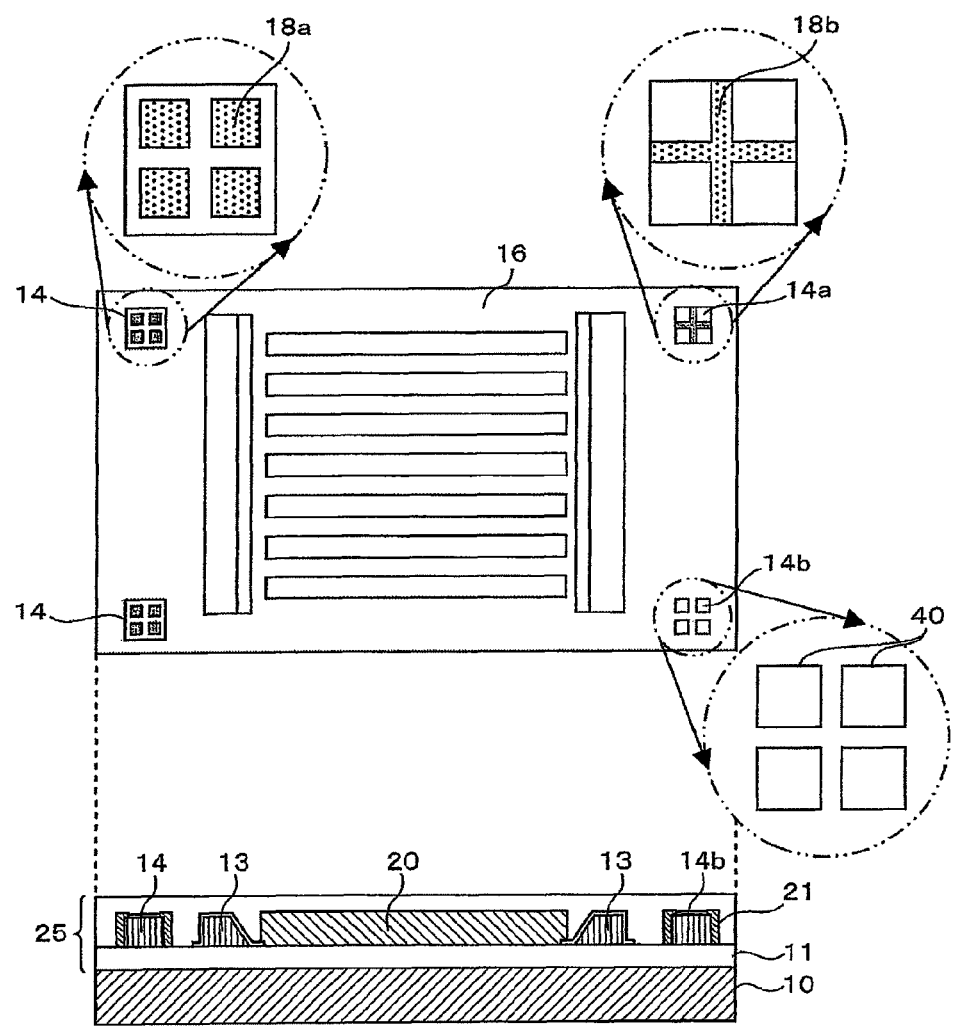
FIG. 4 is a view of the top surface and a cross section of an optical waveguide board that is a fourth embodiment of the present invention.

FIG. 4 is a view of the top surface and a cross section of an optical waveguide board that is a fourth embodiment of the present invention. Here, an example of structural variations of the guiding patterns 14 is shown. As shown in FIG. 4, it is desirable as a structure of the guiding patterns 14, in multi-layer laminate-formation of optical waveguide layers as in the second embodiment, that the guiding patterns 14 are pattern-formed with metal reflective films using a photomask so as to be clearly easily seen, and that, to suppress rotational deviation of the entire patterns as much as possible, the outer frames of the guiding patterns 14 are squares, and cross-patterns with their intersections at the centers of the patterns are provided inside the squares.

In a method of forming the cross-patterns, like the guiding pattern 14 at an upper left part of FIG. 4, square metal reflective film patterns 18a may be configured at four places such that a cross-gap between the patterns with its intersection at the center of the pattern is made. Also, as another example, like a guiding pattern 14a at an upper right part of FIG. 4, a metal reflective film pattern 18b itself may be patterned into a cross, or like a guiding pattern 14b at a lower right part of FIG. 4, guiding pattern members 40 may be configured to be spaced apart from each other to make a cross-gap between the patterns.

Fifth Embodiment

Figure 5:
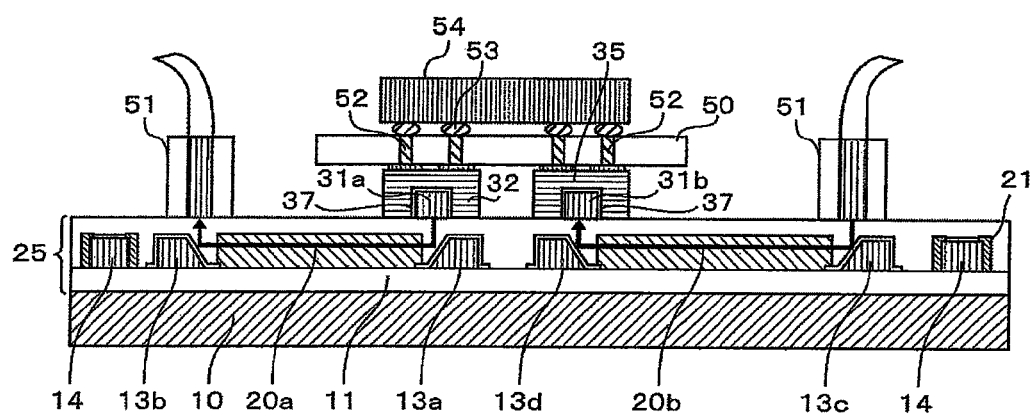
FIG. 5 is a cross-sectional view of an optical-electrical hybrid board that is a fifth embodiment of the present invention.

FIG. 5 is a cross-sectional view of an optical-electrical hybrid board that is a fifth embodiment of the present invention. The configuration is that, as shown in the figure, the optical waveguide layer 25 is formed on the board 10, and light emitted from the laser diode array 32 placed on the optical waveguide layer 25 is optically connected with an optical fiber array 51 having a connector placed on the optical waveguide layer 25 via a guiding pattern 31a, a mirror pattern 13a, a wiring core 20a, and a mirror pattern 13b. On the other hand, on a receiver side, similar to the above-described configuration, light emitted from the optical fiber array 51 having the connector placed on the optical waveguide 25 is optically connected with the photo diode array 35 placed on the optical waveguide 25 via a mirror pattern 13c, a wiring core 20b, a mirror pattern 13d, and a guiding pattern 31b.

Also, the optical-electrical hybrid board in which the laser diode array 32 and the photo diode array 35 are electrically connected with an LSI 54 on the optical waveguide board is configured by mounting the LSI 54 in which a driver IC and an amplifier for optical devices are integrated on the laser diode array 32 and the photo diode array 35 via a wiring board 50 in which via wirings 52 are formed. Also, the structure of optical connection of the optical devices and the optical waveguide is that, similar to the third embodiment, the laser diode array 32 and the guiding pattern 31a, and the photo diode array 35 and the guiding pattern 31b are optically connected by being mated and guided. With the structure of the present invention as above, a high-density optical-electrical hybrid board structure with a smaller mount area can be obtained with a simple fabrication means.

INDUSTRIAL APPLICABILITY

By implementing the present invention, it is possible to provide a guided structure provided in an optical waveguide and an optical connection part in an optical waveguide board that transmits high-speed optical signals transmitted and received between chips and between boards in equipment such as a rack, and an optical-electrical hybrid board that performs bulk processing of the transmitted and received optical signals on the board, that can reduce parts, simplify steps, and be fabricated with high guiding accuracy and a high yield ratio, and a method of manufacturing a board using the same.

REFERENCE SIGNS LIST 10 board
11, 29 clad layer
12 core member
13, 13a, 13b, 13C, 13d, 28 mirror pattern
14, 14a, 14b, 26, 31, 31a, 31b guiding pattern
16 photomask
17 metal blade
18, 18a, 18b metal reflective film
19 core member
20, 20a, 20b, 27 wiring core pattern
21 clad material
22 slope part
24 ultraviolet light
25, 30 optical waveguide layer
32 laser diode array
35 photo diode array
37a, 37b gap
40 guiding pattern member
50 wiring board
51 optical fiber array
52 via wiring
54 LSI
100 mask member
101 opening pattern

The invention claimed is:

1. A method of manufacturing an optical waveguide board having an optical waveguide layer including: a first clad layer formed on a board; a wiring core formed on the first clad layer; a mirror part that converts a pathway of light input and output from above the board into a direction parallel to the board to optically connect with the wiring core; and a second clad layer formed to surround peripheries of the mirror part and the wiring core, the method comprising:
a step of forming simultaneously a mirror pattern for forming the mirror part and at least two guiding patterns on the first clad layer;
a step of working one side surface of the mirror pattern into a tapered shape, and forming the mirror pattern having a tapered part; and
a step of forming a metal film on a surface of the mirror pattern including the tapered part exposed through a second opening part using a mask member retaining a first opening part provided to mate with the guiding patterns and the second opening part provided to make at least the tapered part of the mirror pattern exposed in a state that the guiding patterns and the first opening part are guided by mating.

2. A method of manufacturing an optical waveguide board, the method comprising:
a step of preparing a board;
a step of forming a first clad layer on the board;
a step of providing a first core member made of a photosensitive polymer material on the first clad layer;
a step of working the first core member, and forming simultaneously a mirror pattern for forming a mirror part that converts a pathway of light input and output from above the board into a direction parallel to the board, and at least two guiding patterns having convex shapes on the first clad layer;
a step of working one side surface of the mirror pattern into a tapered shape, and forming the mirror pattern having a tapered part;
a step of forming a metal film on a surface of the mirror pattern including the tapered part exposed through a second opening part using a mask member retaining a first opening part provided to mate with the guiding patterns and the second opening part provided to make at least the tapered part of the mirror pattern exposed in a state that the guiding patterns and the first opening part are guided by mating;
a step of providing a second core member made of a photosensitive polymer material with a refractive index higher than that of a material configuring the first clad layer on a surface including the first clad layer, the mirror pattern, and the guiding patterns;
a step of working the second core member using a mask member for core pattern formation in a state that the guiding patterns and the mask member for core pattern formation are guided, and forming a wiring core adjacent to an end of the mirror pattern on the first clad layer; and
a step of forming a second clad layer to cover the first clad layer and the wiring core, and forming an optical waveguide layer made of the first and second clad layers and the wiring core surrounded thereby.

3. The method of manufacturing an optical waveguide board according to claim 1, wherein the tapered part of the mirror pattern is formed on one side surface on a side facing the wiring core.

4. The method of manufacturing an optical waveguide board according to claim 1, wherein the guiding patterns are formed in an area between the mirror pattern and an end of the board.

5. The method of manufacturing an optical waveguide board according to claim 1, wherein members configuring the first and second clad layers, and the mirror pattern, and a member configuring the wiring core are respectively polymer materials having absorption peaks in a ultraviolet light wavelength band, and the members configuring the first and second clad layers, and the mirror pattern, and the member configuring the wiring core are respectively pattern-formed by photo-lithography using light of a wavelength in the ultraviolet light wavelength band.

6. The method of manufacturing an optical waveguide board according to claim 1, wherein a mask member having the first and second opening parts is fabricated with a thin-film metal machined board with thickness of 0.3 mm or less.

7. The method of manufacturing an optical waveguide board according to claim 1, wherein
a second guiding pattern having a convex shape, and a second mirror pattern are simultaneously formed respectively on the second clad layer positioned on the guiding patterns, and on the second clad layer positioned on the mirror pattern; and a metal film is formed on a surface of the second mirror pattern on which a tapered part is formed, and furthermore a second wiring core is multilayer-laminated on the clad layer adjacent to the second mirror pattern in a state that the second guiding pattern and a second mask member having an opening part formed to mate therewith are guided.

8. A method of manufacturing an optical-electrical hybrid board using the method of manufacturing an optical waveguide board according to claim 2, wherein a second guiding pattern having a convex shape, and a third guiding pattern are formed respectively on the second clad layer positioned on the guiding patterns, and on the second clad layer positioned on the mirror pattern; and a laser diode and a photo diode having concave shapes for mating with the third guiding pattern or an optical module board on which the laser diode and the photo diode are respectively mounted are placed on the third guiding pattern by mating with the third guiding pattern.

* * * * *